United States Patent
Qu et al.

(10) Patent No.: US 11,973,851 B2
(45) Date of Patent: Apr. 30, 2024

(54) SUPPORTING MULTIPLE BORDER GATEWAY PROTOCOL (BGP) SESSIONS USING MULTIPLE QUIC STREAMS

(71) Applicant: Huawei Technologies Co., Ltd., Shenzhen (CN)

(72) Inventors: Yingzhen Qu, Addison, TX (US); Alvaro Retana, Addison, TX (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/081,200

(22) Filed: Dec. 14, 2022

(65) Prior Publication Data
US 2023/0116449 A1    Apr. 13, 2023

Related U.S. Application Data

(63) Continuation of application No. PCT/US2021/037206, filed on Jun. 14, 2021.

(51) Int. Cl.
*H04L 69/164*    (2022.01)
*H04L 65/60*    (2022.01)

(52) U.S. Cl.
CPC .......... *H04L 69/164* (2013.01); *H04L 65/60* (2013.01)

(58) Field of Classification Search
CPC .............................. H04L 69/164; H04L 65/60
See application file for complete search history.

(56) References Cited

U.S. PATENT DOCUMENTS

| | | | |
|---|---|---|---|
| 9,137,116 B1* | 9/2015 | Rijsman | H04L 67/10 |
| 11,258,823 B2* | 2/2022 | Dutta | H04L 63/0428 |
| 11,374,998 B1* | 6/2022 | Halepovic | H04L 65/75 |
| 2010/0208615 A1* | 8/2010 | Soon | H04L 12/4662 370/254 |
| 2018/0288017 A1* | 10/2018 | Stephan | H04L 63/168 |
| 2019/0075189 A1* | 3/2019 | Chen | H04W 60/005 |
| 2020/0084663 A1* | 3/2020 | Park | H04W 80/10 |
| 2021/0409447 A1* | 12/2021 | Dutta | H04L 69/24 |
| 2022/0094637 A1* | 3/2022 | Dutta | H04L 45/033 |
| 2022/0116319 A1* | 4/2022 | Dutta | H04L 45/64 |
| 2022/0166832 A1* | 5/2022 | Belkar | H04L 69/22 |
| 2022/0191139 A1* | 6/2022 | Dutta | H04L 69/22 |
| 2022/0247696 A1* | 8/2022 | He | H04L 47/56 |

(Continued)

OTHER PUBLICATIONS

Iyengar et al. "RFC 9000 QUIC: A UDP-Based Multiplexed and Secure Transport", May 2021 (Year: 2021).*

(Continued)

*Primary Examiner* — David R Lazaro
(74) *Attorney, Agent, or Firm* — Conley Rose, P.C.

(57) ABSTRACT

A method of establishing streams within a QUIC connection implemented by a first network device, comprising: transmitting a first open message through the QUIC connection to a second network device, the first open message identifying a protocol; receiving a second open message through the QUIC connection from the second network device in response to transmitting the first open message, the second open message identifying the protocol; and establishing a first stream between the first network device and the second network device within the QUIC connection for the protocol identified in the first open message and in the second open message.

20 Claims, 8 Drawing Sheets

(56) References Cited

U.S. PATENT DOCUMENTS

2023/0116449 A1* 4/2023 Qu .................... H04L 65/1069
709/224

OTHER PUBLICATIONS

Chen, S., et al., "BGP Over QUIC," draft-chen-idr-bgp-over-quic-00, Jun. 3, 2021, 23 pages.
Rekhter, Y., Ed., et al., "A Border Gateway Protocol 4 (BGP-4)," RFC 4271, Jan. 2006, 104 pages.
Bates, T., el al., "Multiprotocol Extensions for BGP-4," RFC 4760, Jan. 2007, 12 pages.
Scudder, J., et al., "Capabilities Advertisement with BGP-4," RFC 5492, Feb. 2009, 7 pages.
Friedl, S., et al., "Transport Layer Security (TLS) Application-Layer Protocol Negotiation Extension," RFC 7301, Jul. 2014, 9 pages.
Patel, K., et al., "Enhanced Route Refresh Capability for BGP-4," RFC 7313, Jul. 2014, 8 pages.
Thomson, M., Ed., et al., "Using TLS to Secure QUIC," RFC 9001, May 2021, 52 pages.

* cited by examiner

SUPPORTING MULTIPLE BORDER GATEWAY PROTOCOL (BGP) SESSIONS USING MULTIPLE QUIC STREAMS

CROSS-REFERENCE TO RELATED APPLICATIONS

This patent application is a continuation of International Application No. PCT/US2021/037206 filed on Jun. 14, 2021, by Futurewei Technologies, Inc., and titled "Supporting Multiple Border Gateway Protocol (BGP) Sessions Using Multiple QUIC Streams," which is hereby incorporated by reference.

TECHNICAL FIELD

The present disclosure is generally related to the border gateway protocol (BGP) and, in particular, to providing support for multiple BGP sessions using multiple QUIC streams.

BACKGROUND

Border Gateway Protocol (BGP) is a standardized exterior gateway protocol designed to exchange routing and reachability information among autonomous systems (AS) on the Internet. BGP is classified as a path-vector routing protocol, and makes routing decisions based on paths, network policies, or rule-sets configured by a network administrator. BGP is defined in Internet Engineering Task Force (IETF) document Request for Comments (RFC) 4271 entitled "A Border Gateway Protocol 4 (BGP-4)" by Y. Rekhter, et al., published January 2006.

QUIC (pronounced "quick") is a general-purpose transport layer network protocol initially designed by Google®. Although its name was initially proposed as the acronym for "Quick UDP Internet Connections," the IETF's use of the word QUIC is not an acronym; it is simply the name of the protocol. QUIC is used by more than half of all connections from the Chrome web browser to Google's servers. Browsers such as Microsoft® Edge, Mozilla® Firefox, and Apple® Safari support QUIC, even if QUIC is not enabled by default.

SUMMARY

The disclosed aspects/embodiments provide techniques for supporting BGP multi-sessions using QUIC streams. The disclosed embodiments permit a single stream (a.k.a., session) in a QUIC connection to be terminated when a malformed message is encountered instead of having to terminate the entire transmission control protocol (TCP) connection as done before. The ability to terminate a single stream instead of the entire TCP connection provides numerous benefits, including improving network reliability and ensuring efficient use of network resources (e.g., routers).

A first aspect relates to a method of establishing streams within a QUIC connection implemented by a first network device. The method includes transmitting a first open message through the QUIC connection to a second network device, the first open message identifying a protocol; receiving a second open message through the QUIC connection from the second network device in response to transmitting the first open message, the second open message identifying the protocol; and establishing a first stream between the first network device and the second network device within the QUIC connection for the protocol identified in the first open message and in the second open message.

Optionally, in any of the preceding aspects, another implementation of the aspect provides that the first open message indicates that the first router has multi-stream capability, and wherein the second open message indicates that the second router has multi-stream capability.

Optionally, in any of the preceding aspects, another implementation of the aspect provides that the protocol is identified using an address family identifier (AFI) and a subsequent address family identifier (SAFI).

Optionally, in any of the preceding aspects, another implementation of the aspect provides that the first open message identifies a first plurality of protocols including the protocol.

Optionally, in any of the preceding aspects, another implementation of the aspect provides that the second open message identifies a second plurality of protocols including the protocol.

Optionally, in any of the preceding aspects, another implementation of the aspect provides transmitting a third open message through the QUIC connection to the second network device, the third open message identifying a second protocol; receiving a fourth open message through the QUIC connection from the second network device in response to transmitting the third open message, the fourth open message identifying the second protocol; and establishing a second stream between the first network device and the second network device within the QUIC connection for the second protocol identified in the third open message and in the fourth open message.

Optionally, in any of the preceding aspects, another implementation of the aspect provides receiving a third open message through the QUIC connection from the second network device, the third open message identifying a second protocol; transmitting a fourth open message through the QUIC connection to the second network device in response to receiving the third open message, the fourth open message identifying the second protocol; and receiving second application data though a second stream established between the first network device and the second network device within the QUIC connection, the second application data corresponding to the second protocol identified in the first open message and in the second open message.

Optionally, in any of the preceding aspects, another implementation of the aspect provides transmitting a QUIC connection request to the second network device; receiving a first acknowledgement (ACK) message from the second network device in response to transmitting the QUIC connection request; and transmitting a second ACK message to the second network device to confirm that a QUIC connection has been established in accordance with the QUIC connection request.

Optionally, in any of the preceding aspects, another implementation of the aspect provides that the QUIC connection request comprises one or more of a request to perform a QUIC handshake and transport layer security (TLS) authentication according to a QUIC protocol.

Optionally, in any of the preceding aspects, another implementation of the aspect provides that the first ACK message indicates to the first router that the second router is capable of establishing the QUIC connection.

Optionally, in any of the preceding aspects, another implementation of the aspect provides that the first stream comprises a control stream, wherein the control stream is used to manage other streams within the QUIC connection, and wherein the control stream does not carry any application data.

Optionally, in any of the preceding aspects, another implementation of the aspect provides transmitting or receiving a notification message carrying a cease error code, the cease error coding indicating that the first stream or the second stream is to be torn down.

Optionally, in any of the preceding aspects, another implementation of the aspect provides that Optionally, in any of the preceding aspects, another implementation of the aspect provides transmitting or receiving a cease connection message, the cease connection message indicating that the QUIC connection is to be torn down.

A second aspect relates to a method of establishing streams within a QUIC connection implemented by a second network device. The method includes receiving a first open message through the QUIC connection from a first network device, the first open message identifying a protocol; transmitting a second open message through the QUIC connection to the first network device in response to receiving the first open message, the second open message identifying the protocol; and receiving first application data though a first stream established between the first network device and the second network device within the QUIC connection, the first application data corresponding to the protocol identified in the first open message and in the second open message.

Optionally, in any of the preceding aspects, another implementation of the aspect provides that the first open message indicates that the first router has multi-stream capability, and wherein the second open message indicates that the second router has multi-stream capability.

Optionally, in any of the preceding aspects, another implementation of the aspect provides that the protocol is identified using an address family identifier (AFI) and a subsequent address family identifier (SAFI).

Optionally, in any of the preceding aspects, another implementation of the aspect provides that the first open message identifies a first plurality of protocols including the protocol.

Optionally, in any of the preceding aspects, another implementation of the aspect provides that the second open message identifies a second plurality of protocols including the protocol.

Optionally, in any of the preceding aspects, another implementation of the aspect provides receiving a third open message through the QUIC connection from the first network device, the third open message identifying a second protocol; transmitting a fourth open message through the QUIC connection to the first network device in response to receiving the third open message, the fourth open message identifying the second protocol; and receiving second application data though a second stream established between the first network device and the second network device within the QUIC connection, the second application data corresponding to the protocol identified in the third open message and in the fourth open message.

A third aspect relates to an apparatus in a network and configured to establish streams within a QUIC connection. The apparatus includes a memory storing instructions; and one or more processors coupled to the memory, and configured to: transmit a first open message through the QUIC connection to a second network device, the first open message identifying a protocol; receive a second open message through the QUIC connection from the second network device in response to transmitting the first open message, the second open message identifying the protocol; and establish a first stream between the first network device and the second network device within the QUIC connection for the protocol identified in the first open message and in the second open message.

Optionally, in any of the preceding aspects, another implementation of the aspect provides that the first open message indicates that the first router has multi-stream capability, and wherein the second open message indicates that the second router has multi-stream capability.

Optionally, in any of the preceding aspects, another implementation of the aspect provides that the protocol is identified using an address family identifier (AFI) and a subsequent address family identifier (SAFI).

Optionally, in any of the preceding aspects, another implementation of the aspect provides that the first open message identifies a first plurality of protocols including the protocol.

Optionally, in any of the preceding aspects, another implementation of the aspect provides that the second open message identifies a second plurality of protocols including the protocol.

Optionally, in any of the preceding aspects, another implementation of the aspect provides that the one or more processors are further configured to: transmit a third open message through the QUIC connection to the second network device, the third open message identifying a second protocol; receive a fourth open message through the QUIC connection from the second network device in response to transmitting the third open message, the fourth open message identifying the second protocol; and establish a second stream between the first network device and the second network device within the QUIC connection for the second protocol identified in the third open message and in the fourth open message.

A fourth aspect relates to a method of establishing streams within a QUIC connection implemented by a first network device means. The method includes means for transmitting a first open message through the QUIC connection to a second network device means, the first open message identifying a protocol; means for receiving a second open message through the QUIC connection from the second network device means in response to transmitting the first open message, the second open message identifying the protocol; and means for establishing a first stream between the first network device means and the second network device means within the QUIC connection for the protocol identified in the first open message and in the second open message.

A fifth aspect relates to a method of establishing streams within a QUIC connection implemented by a second network device means. The method includes means for receiving a first open message through the QUIC connection from a first network device means, the first open message identifying a protocol; means for transmitting a second open message through the QUIC connection to the first network device means in response to receiving the first open message, the second open message identifying the protocol; and means for receiving first application data though a first stream established between the first network device means and the second network device means within the QUIC connection, the first application data corresponding to the protocol identified in the first open message and in the second open message.

A sixth aspect relates to system for establishing streams within a QUIC connection. The system includes a first network device configured to implement one or more of the disclosed methods; and a second network device in communication with the first network device, the second network device configured to implement one or more of the disclosed methods.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

QUIC is a new user datagram protocol (UDP)-based multiplexed and secure transport protocol. Some of the benefits of QUIC include low latency, encrypted transport, and resilient connections (e.g., 18-byte connection identifiers IDs)). QUIC was designed to supplement or replace transmission control protocol (TCP) for some applications and, therefore, is sometimes referred to as TCP/2.

Figure 1:
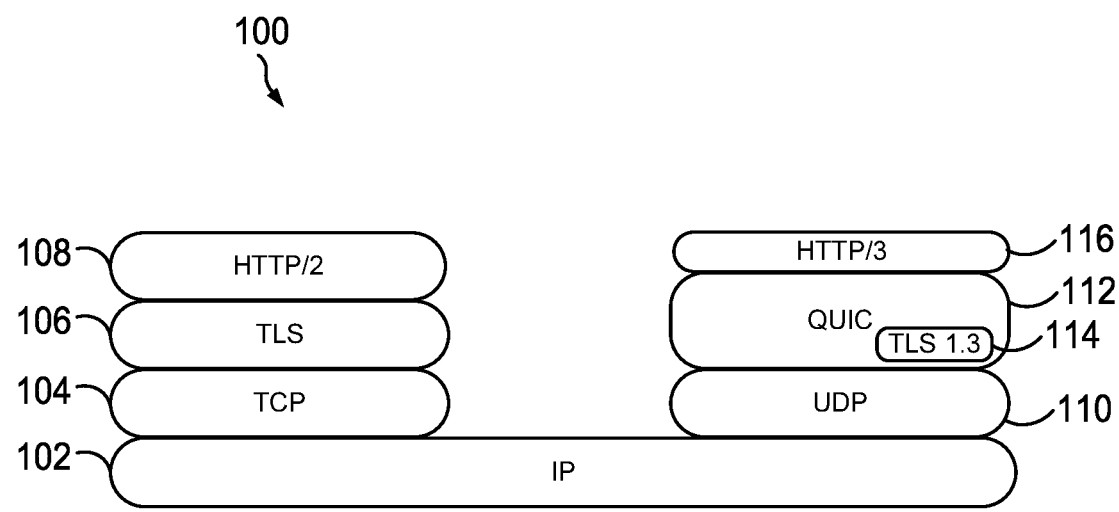
FIG. 1 illustrates an open systems interconnection (OSI) model.

FIG. 1 illustrates an open systems interconnection (OSI) model 100. The OSI model 100 is a conceptual framework used to describe the functions of a networking system. The OSI model characterizes computing functions into a universal set of rules and requirements in order to support interoperability between different products and software.

The OSI model 100 includes an interne protocol (IP) layer 102. On the left side of the OSI model 100, the IP layer 102 supports a TCP layer 104. The TCP layer 104 supports a transport layer security (TLS) layer 106, which in turn supports a hypertext transfer protocol (HTTP) layer 108 known as HTTP/2. On the right side of the OSI model 100, the IP layer 102 supports a UDP layer 110. The UDP layer supports a QUIC layer 112 (which includes TLS layer 114), which in turn supports an HTTP layer 116 known as HTTP/3.

Figure 2:
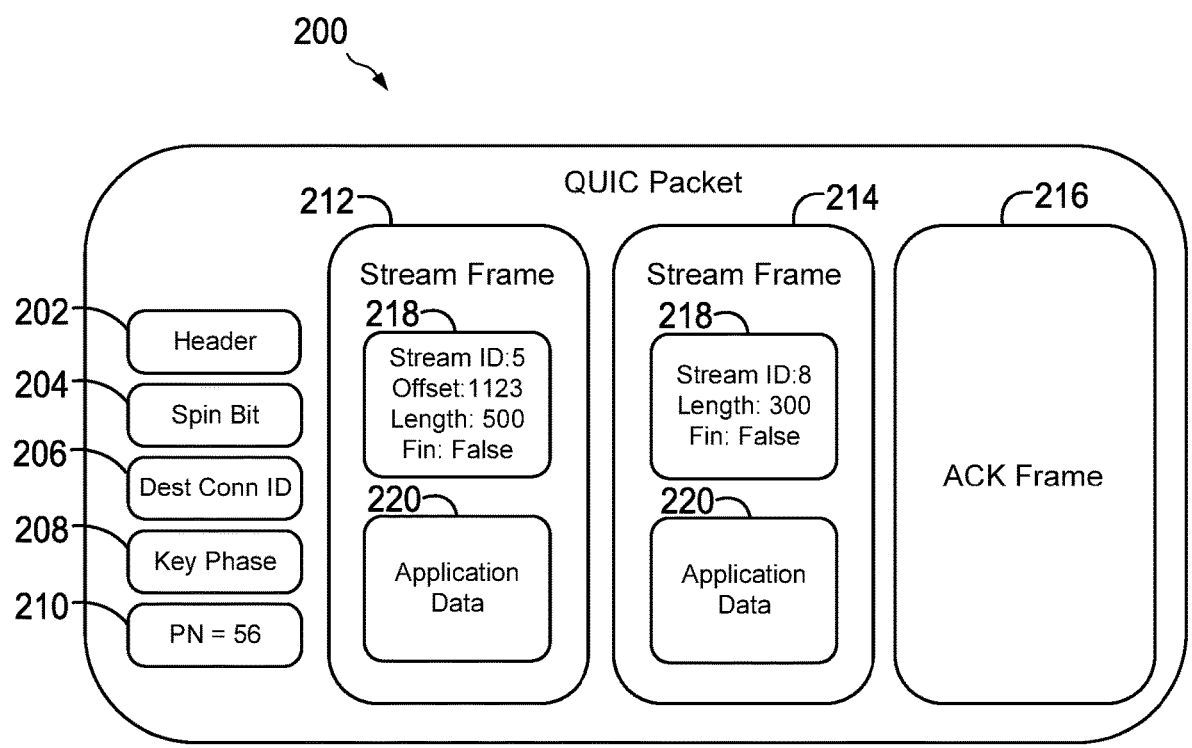
FIG. 2 illustrates a QUIC packet that may be transported according to the QUIC protocol.

FIG. 2 illustrates a QUIC packet 200 that may be transported according to the QUIC protocol. The QUIC packet 200 includes, for example, a header 202, a spin bit 204, a destination connection ID 206, a key phase 208, and a packet number (PN) 210. In addition, the QUIC packet 200 includes one or more stream frames such as, for example, a first stream frame 212 and a second stream frame 214, and an acknowledgement (ACK) frame 216. While two stream frames and one ACK frame are shown in FIG. 2, more or fewer stream frames and ACK frames may be included in the QUIC packet 200 in practical applications.

The first stream frame 212 and the second stream frame 214 each include parameters 218 particular to the stream such as, for example, a stream ID, an offset, a length, and/or a finished (Fin) indicator. The stream ID identifies the stream frame. The offset is a pointer that specifies a location for the stream frame, and the length specifies a length of the stream frame. The finished indicator indicates whether the stream frame is the last stream frame in the flow or not. Other parameters may be included in the first stream frame 212 and the second stream frame 214 in practical applications.

The first stream frame 212 and the second stream frame 214 also include application data 220. The application data 220 may be considered the payload of the first stream frame 212 and the second stream frame 214. That is, the application data 220 is the information being transported by the stream for the benefit of the receiver (e.g., the user requesting the data/information). The ACK frame 216 is sent to the receiver to acknowledge that the QUIC frame was received by the receiver.

As shown in FIG. 2, one quick packet 200 may include stream frames corresponding to different streams. For example, the first stream frame 212 corresponds to the stream having the stream ID of 5 while the second stream frame 214 corresponds to the stream having the stream ID of 8. Thus, each stream is a separate "ordered stream" of bytes. Stream flow control can be used to limit the number of bytes that can be sent on a stream. Multiple streams can be multiplexed onto an underlying connection.

BGP traditionally uses TCP (e.g., TCP 104 in FIG. 1). BGP peers (e.g., routers) exchange incremental, triggered route updates. Multiprotocol BGP (MP-BGP) is defined in IETF document RFC 4760 entitled "Multiprotocol Extensions for BGP-4" by T. Bates, et al., published January 2007. MP-BGP permits different types of address families to be distributed in parallel. By way of example, the address family identifier (AFI) having the number one (1) signifies internet protocol version four (IPv4), while the AFI having the number two (2) signifies internet protocol version six (IPv6). The subsequent address family identifier (SAFI) having the number one (1) signifies unicast, while the SAFI having the number two (2) signifies multicast. While MP-BGP extends BGP to allow information for multiple address families (e.g., AFI, SAFI, etc.), MP-BGP is typically implemented under one TCP session (a.k.a., TCP connection) with each peer. While the protocol does not have this limitation, BGP often starts with one AFI/SAFI and later adds more. So, many implementations end up using one TCP connection carrying all of the AFI/SAFI.

A BGP speaker may use the optional parameter known as BGP capabilities to convey to a BGP peer a list of capabilities supported by the BGP speaker. This procedure is further defined in IETF document RFC 5492 entitled "Capabilities Advertisement with BGP-4" by J. Scudder, et al., published February 2009.

Unfortunately, MP-BGP has drawbacks. Indeed, one malformed message from one particular address family (e.g., AFI) may require an entire TCP session to be terminated. For example, when a TCP connection established to carry IPv4 unicast, IPv6 unicast, and virtual private network version 4 (VPNv4) messages encounters an abnormal IPv4 unicast message, the entire TCP session may have to be torn down and re-established. That is, the abnormal IPv4 unicast message causes the IPv6 unicast and VPNv4 messages to negatively impacted (e.g., delayed or dropped). MP-BGP also has other drawbacks. For instance, messages from all families are given the same treatment or priority, which can lead to undesirable results.

Disclosed herein are techniques for supporting BGP multi-sessions using QUIC streams. As will be more fully explained below, the disclosed embodiments permit a single stream (a.k.a., session) in a QUIC connection to be terminated when a malformed message is encountered instead of having to terminate the entire TCP connection as done before. The ability to terminate a single stream instead of the entire TCP connection provides numerous benefits, including improving network reliability and ensuring efficient use of network resources (e.g., routers).

Figure 3:
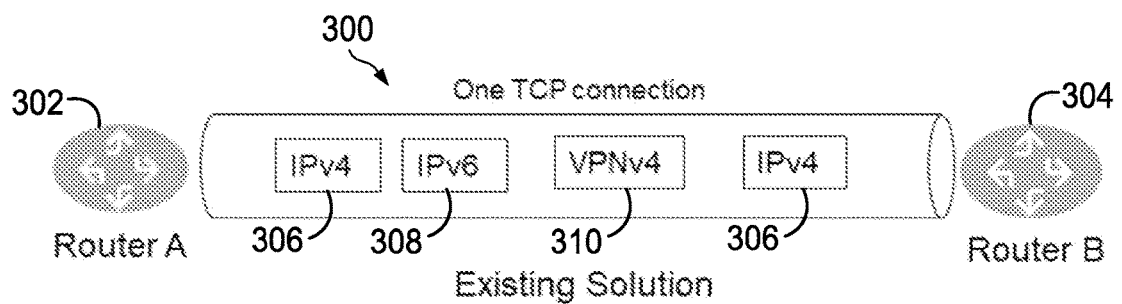
FIG. 3 illustrates a transmission control protocol (TCP) connection according to an existing solution.

FIG. 3 illustrates a TCP connection 300 according to an existing solution. As shown, the TCP connection 300 extends between a first router 302 and a second router 304. The TCP connection 300 may be established according to the BGP protocol. The first router 302 and the second router 304 may be referred to as peers or BGP peers.

The TCP connection 300 is configured to carry traffic from different AFI/SFI families. For example, the TCP connection 300 in FIG. 3 is depicted carrying IPv4 unicast messages 306, IPv6 unicast messages 308, and VPNv4 messages 310. These different message types have been multiplexed together so that they can all be transmitted on the single TCP connection. Other types of messages may be carried by the TCP connection 300 in practical embodiments.

As noted above, one malformed message (e.g., the IPv6 unicast message 308) may block or impair the TCP connection 300. Therefore, the entire TCP connection 300 has to be terminated and re-established even though the other messages (e.g., the IPv4 unicast message 306 and the VPNv4 message 310) are normal. This disrupts traffic for all of the address families. To resolve this problem, techniques for supporting BGP multi-sessions using QUIC streams are disclosed.

Figure 4:
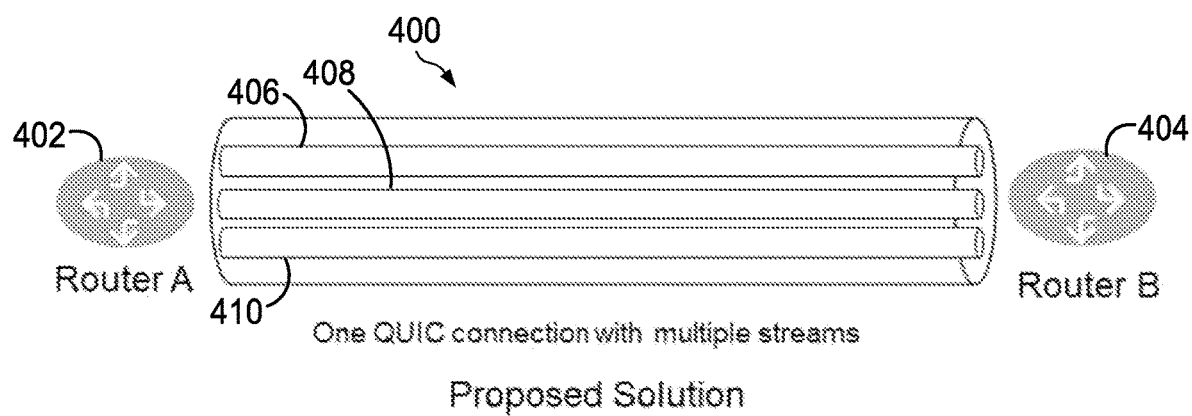
FIG. 4 illustrates a QUIC connection according to an embodiment of the disclosure.

FIG. 4 illustrates a QUIC connection 400 according to an embodiment of the disclosure. As shown, the TCP connection 400 extends between a first router 402 and a second router 404. The QUIC connection 400 may be established according to the QUIC protocol. The first router 402 and the second router 404 may be referred to as peers or BGP peers.

The QUIC connection 400 is configured to include a plurality of streams (a.k.a., sessions). In FIG. 4, the QUIC connection 400 includes a first stream 406, a second stream 408, and a third stream 410. While three streams are shown, more or fewer streams may be carried by a QUIC connection 400 in practical applications. That is, multiple streams or sessions are supported between the peers.

As shown, the first stream 406, the second stream 408, and the third stream 410 are independent of each other. That is, a restart, reset, or some other event affecting one stream (e.g., the first stream 406) has no impact on the other streams (e.g., the second stream 408 and the third stream 410). In an embodiment, each of the first stream 406, the second stream 408, and the third stream 410 has its own unique QUIC stream ID.

In an embodiment, the first stream 406, the second stream 408, and the third stream 410 are established based on AFI and/or SAFI. For example, the first stream 406 may be configured to carry IPv4 unicast messages, the second stream 408 may be configured to carry IPv6 unicast messages, and the third stream may be configured to carry VPNv4 messages. In an embodiment, a stream (e.g., the first stream 406) may be configured to carry more than one type of message when agreed upon by the peers (e.g., the first router 402 and the second router 404). For example, a stream (e.g., the second stream 408) may be configured to carry both IPv4 unicast messages and IPv6 unicast messages.

Figure 5:
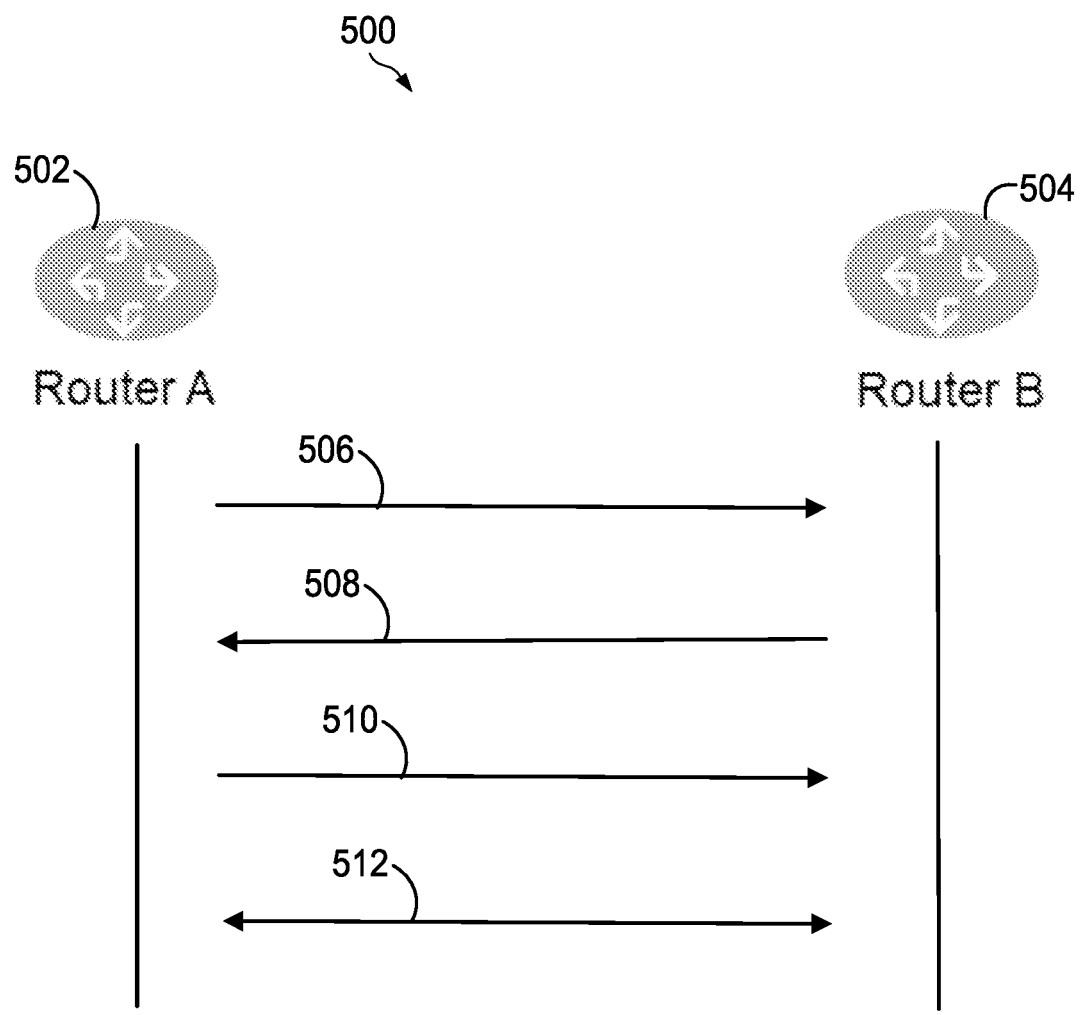
FIG. 5 is a sequence diagram illustrating the setup of a QUIC connection.

FIG. 5 is a sequence diagram 500 illustrating the setup of a QUIC connection. The QUIC connection is similar to the QUIC connection 400 in FIG. 4. As shown, the first router 502 transmits a QUIC connection request 506 to the second router 504. In an embodiment, the QUIC connection request 506 represents a request to perform a QUIC handshake and/or TLS authentication according to the QUIC protocol.

In response to receiving the QUIC connection request 506, the second router 504 transmit an acknowledgement (ACK) message 508 to the first router 502. The ACK message 508 indicates to the first router 502 that the second router 504 is willing and able to establish a QUIC connection. That is, the ACK message 508 confirms that the second router 504 has the capability to communicate with the first router 502 via a QUIC connection.

In response to receiving the ACK message 508, the first router 502 transmits an ACK message 510 back to the second router 504. The ACK message 510 confirms that a QUIC connection 512 has been established in accordance with the QUIC connection request 506. It should be understood that only the QUIC connection 512 utilizes the QUIC handshake and TLS authentication. That is, the QUIC handshake and/or TLS authentication are not needed to establish the individual streams within the QUIC connection 400, as will be more fully explained below.

Figure 6:
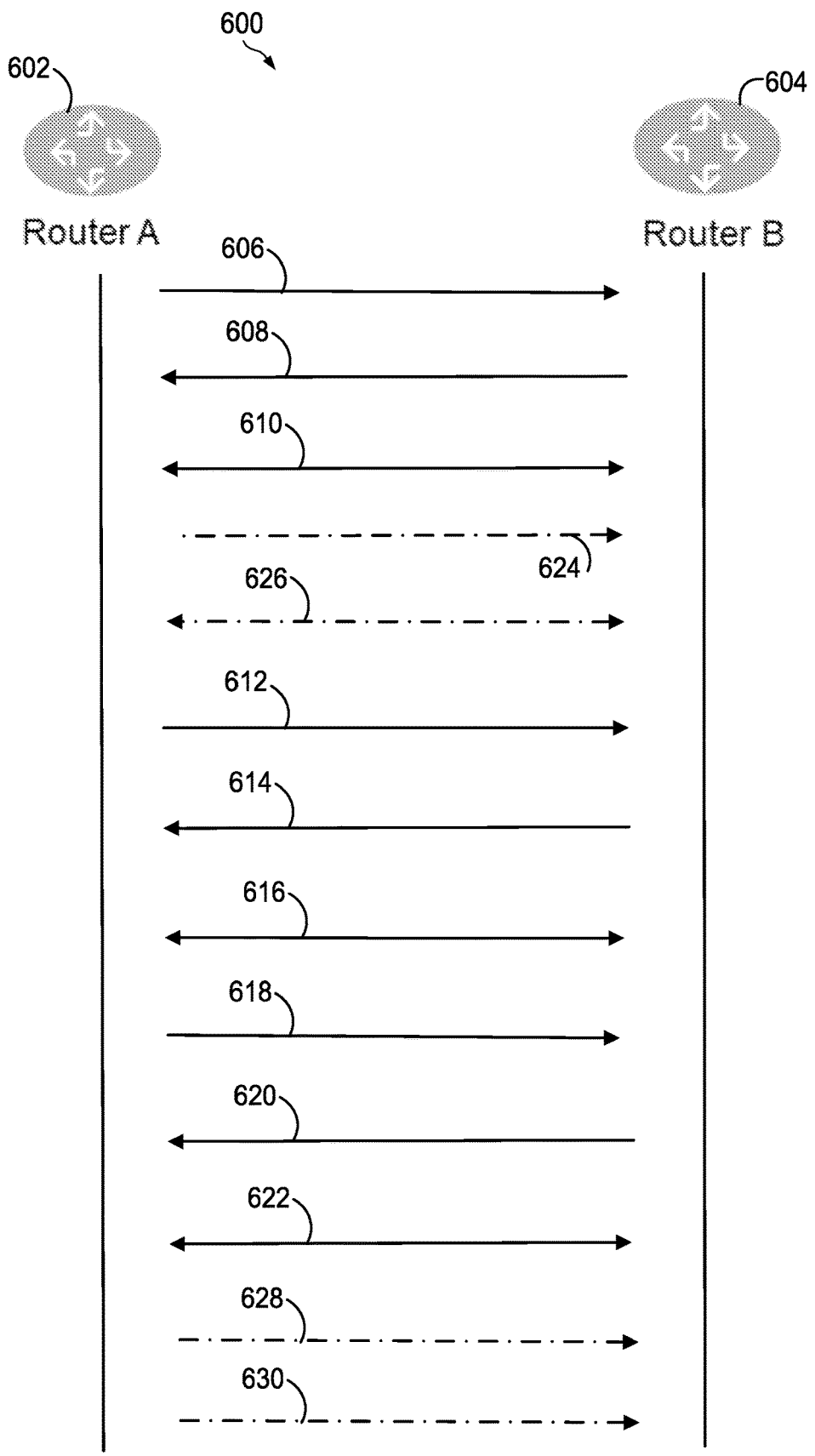
FIG. 6 is a sequence diagram illustrating the setup of streams within a QUIC connection.

FIG. 6 is a sequence diagram 600 illustrating the setup of streams within a QUIC connection. That is, the sequence diagram 600 is implemented after the QUIC connection has been established. The streams may be similar to the first stream 406, the second stream 408, and the third stream 410 in FIG. 4. The QUIC connection may be similar to the QUIC connection 400 in FIG. 4.

As shown in FIG. 6, the sequence diagram 600 is implemented by a first router 602 and a second router 604. In the illustrated embodiment, the first router 602 and the second router 604 each support BGP. That is, the routers each have BGP capabilities. As such, the streams being set up may be referred to as BGP streams or BGP sessions.

The first router 602 transmits an open message 606 to the second router 604. The open message 606 is used to establish BGP adjacency. In an embodiment, the open message 606 includes a BGP version number, an autonomous system number (ASN) of the originating router, a hold timer (a.k.a., or hold time), a BGP identifier, and other optional parameters that establish BGP capabilities. The version number indicates the version of BGP being used. The ASN is a number assigned by Internet Assigned Numbers Authority (IANA). The ASN uniquely identifies each network on the Internet.

The hold timer is a value indicating how long a stream should be held open. For example, the hold timer may be one hundred eighty seconds. When the hold timer is exceeded, the stream may be terminated. Upon receipt of a message, the hold timer is reset. Therefore, as long as messages are being sent the stream remains active. When the hold timer reaches zero, the BGP session is torn down. The hold timer is a heartbeat mechanism for BGP neighbors to ensure that the neighbor is healthy and alive.

The BGP identifier is a 32-bit unique number that identifies the BGP router. The BGP identifier is sometimes referred to as a BGP Router-ID (RID). The RID can be used as a loop prevention mechanism for routers advertised within an autonomous system. The RID can be set manually or dynamically for BGP. Router-IDs typically represent an IPv4 address that resides on the router, such as a loopback address.

The open message 606 can identify the protocol to be used for communication. To do so, the open message 606 may specify a particular address family and sub-address family. For example, the open message 606 may indicate an AFI/SAFI of 1/1. The first one corresponds to the address family and signifies IPv4. The second one corresponds to the sub-address family and signifies unicast.

The open message 606 can also indicate that the first router 602 has multi-session capability. That is, the first router 606 is able to communicate with peers via a plurality of individual streams.

In response to receiving the open message 606, the second router 604 accepts the connection and transmits an open message 608 to the first router 602. The open message 608 may be similar to the open message 606. That is, the open message 608 can identify the protocol to be used for communication. To do so, the open message 608 may specify a particular address family and sub-address family. In the illustrated embodiment, the open message 608 may indicate an AFI/SAFI of 1/1 and indicate that the second router 604 also has multi-session capability. Because the AFI/SAFI of the open message 606 and the open message 608 match, a two-way stream 610 is established for IPv4 unicast between the first router 604 and the second router 606. Once established, application data (e.g., application data 220) may be transmitted over the two-way stream 610 corresponding to IPv4 unicast. The two-way stream 610 may be referred to as a QUIC stream.

Continuing with the example in FIG. 6, the first router 602 transmits another open message 612 to the second router 604. The open message 612 may indicate an AFI/SAFI of 1/128. The first one signifies IPv4, and the one hundred twenty-eight signifies L3VPN. In response to receiving the open message 612, the second router 604 accepts the connection and transmits an open message 614 to the first router 602. The open message 614 also indicates an AFI/SAFI of 1/128. Because the AFI/SAFI of the open message 612 and the open message 614 match, a two-way stream 616 is established for IPv4 L3VPN between the first router 602 and the second router 604. Once established, application data (e.g., application data 220) may be transmitted over the two-way stream 616 corresponding to IPv4 L3VPN.

Thereafter, the first router 602 transmits another open message 618 to the second router 604. The open message 618 may indicate an AFI/SAFI of 2/1. The two signifies IPv6, and one signifies unicast. In response to receiving the open message 618, the second router 604 accepts the connection and transmits an open message 620 to the first router 602. The open message 620 also indicates an AFI/SAFI of 2/1. Because the AFI/SAFI of the open message 618 and the open message 620 match, a two-way stream 622 is established for IPv6 unicast between the first router 602 and the second router 604. Once established, application data (e.g., application data 220) may be transmitted over the two-way stream 622 corresponding to IPv6 unicast. It should be understood that this process may continue in order to set up additional streams.

In multi-session BGP as illustrated in FIG. 6, each stream has its own open message. When AFT/SAFI-based streams are used, different streams may have different parameters and/or capabilities. For example, the hold timer of the two-way stream 610 may be different than the hold timer of the two-way stream 622. As another example, BGP security (BGPSec) may be enabled for the two-way stream 616 but not the two-way stream 610.

In an embodiment, an open message such as open message 606 is only sent when a first stream is being established. For example, the open message 606 transmitted by the first router 602 could indicate that two or more AFIs/SAFIs and two or more capabilities are supported. Indeed, the first open message 606 might indicate that IPv4 unicast, IPv6 unicast, and IPv4 L3VPN are all supported by the first router 602. In response to receiving the open message 606, the second router 604 transmits the open message 608 to the first router 602. The open message 608 indicates that the second router 604 agrees to establish two-way stream 610 for IPv4 unicast, but does not agree to establish any streams for IPv6 unicast and IPv4 L3VPN even though those protocols are supported by the second router 604.

In such a circumstance, the first router 602 can optionally transmit an update message 624 to the second router 604. The update message 624 may be used to establish another stream (e.g., two-way stream 616 or two-way stream 622) without having to send additional open messages (e.g., open message 612 or open message 618). That is, the update message 624 may be used to establish two-way stream 626 for IPv6 unicast since the first router 602 already knows that the second router 604 supports this protocol. Should further streams for further supported protocols be desired, additional update messages may be transmitted.

In an embodiment, an open message (e.g., open message 606) may be transmitted within a separately established control stream established between the first router 602 and the second router 604. The control stream may be similar to the streams disclosed herein, except the control stream is responsible for control and management of the entire QUIC connection (e.g., QUIC connection 400). In multi-session BGP, each stream may have its own keepalive messages so that the streams can be reset or terminated independently. When a control session has been implemented, keep alive messages can only be transmitted in the control stream.

In an embodiment, a BGP peer may choose to close a stream by sending a notification message. For example, the first router 602 may close the stream 610 by transmitting notification message 628 to the second router 604. In an embodiment, the notification message 628 may carry the error code "cease" to indicate that the stream 610 will be closed or torn down. In an embodiment, a cease connection message 630 is transmitted in order to close or tear down the entire QUIC connection. The notification message 628 and the cease connection message 630 may be transmitted by either the first router 602 or the second router 604.

In an embodiment, each stream (e.g., stream 610, stream 616, etc.) handles BGP notifications according to IETF document RFC 4271 and IETF document RFC 7313 entitled "Enhanced Route Refresh Capability for BGP-4" by K. Patel, et al., published July 2014.

Figure 7:
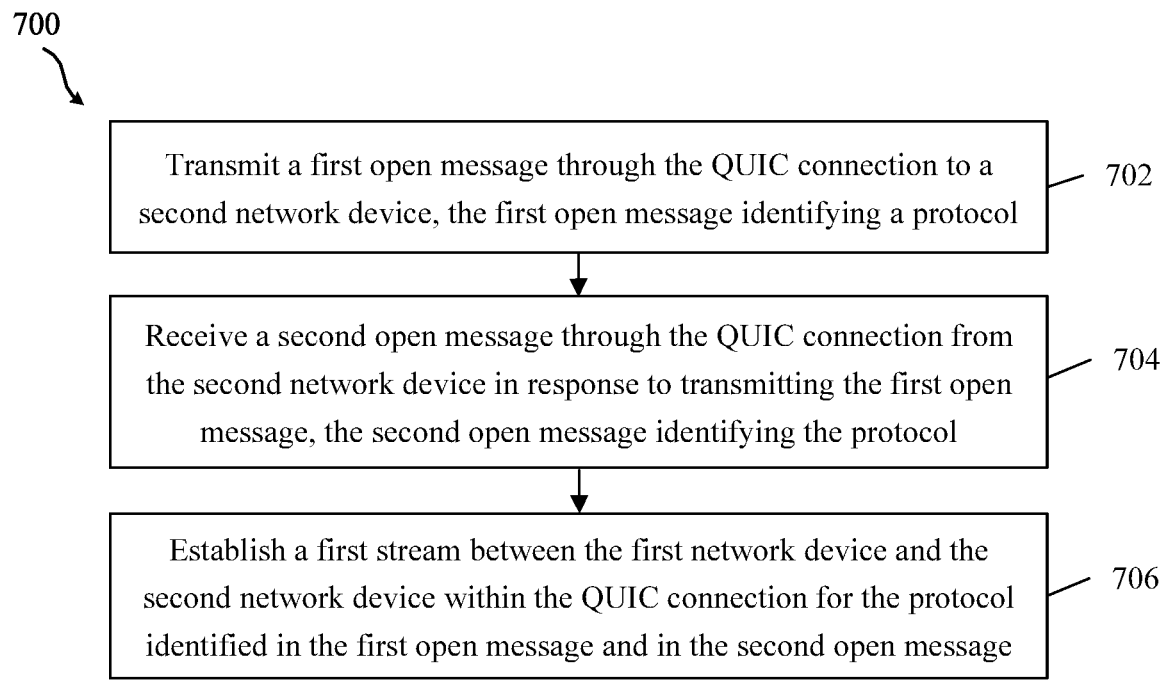
FIG. 7 is a method of establishing streams within a QUIC connection implemented by a first network device.

FIG. 7 is a method of establishing streams (e.g., streams 406-410) within a QUIC connection (e.g., QUIC connection 400) implemented by a first network device (e.g., first router 602).

In block 702, a first open message (e.g., open message 606) is transmitted through the QUIC connection to a second network device (e.g., second router 604). The first open message identifies a protocol (e.g., IPv4 unicast). In an embodiment, the first open message indicates that the first router has multi-stream capability. In an embodiment, the protocol is identified using AFI and/or SAFI. In an embodiment, the first open message identifies a first plurality of protocols (e.g., IPv4 unicast, IPv6 unicast, IPv4 L3VPN, etc.) including the protocol (e.g., IPv4 unicast).

In block 704, a second open message (e.g., open message 608) is received through the QUIC connection from the second network device in response to transmitting the first open message. The second open message identifies the same protocol (e.g., IPv4 unicast). In an embodiment, the second open message indicates that the second router has multi-stream capability. In an embodiment, the second open message identifies a second plurality of protocols (e.g., IPv4 unicast, IPv4 L3VPN, etc.) including the protocol (e.g., IPv4 unicast).

In block 706, a first stream (e.g., first stream 406, 610) is established between the first network device and the second network device within the QUIC connection for the protocol identified in the first open message and in the second open message.

In an embodiment, the method 700 further comprises transmitting a third open message (e.g., open message 612) through the QUIC connection to the second network device. The third open message identifying a second protocol (e.g., IPv4 L3VPN). The method 700 also comprises receiving a fourth open message (e.g., open message 614) through the QUIC connection from the second network device in response to transmitting the third open message. The fourth open message also identifies the second protocol (e.g., IPv4 L3VPN). The method 700 further comprises establishing a second stream (e.g., stream 616) between the first network device and the second network device within the QUIC connection for the second protocol identified in the third open message and in the fourth open message.

In an embodiment, the method 700 further comprises transmitting a QUIC connection request (e.g., QUIC connection request 506) to the second network device, receiving a first ACK message (e.g., ACK message 508) from the second network device in response to transmitting the QUIC connection request, and transmitting a second ACK message (e.g., ACK message 510) to the second network device to confirm that a QUIC connection (e.g., QUIC connection 400, 512) has been established in accordance with the QUIC connection request.

In an embodiment, the first ACK message indicates to the first router that the second router is capable of establishing the QUIC connection. In an embodiment, the QUIC connection request comprises one or more of a request to perform a QUIC handshake and TLS authentication according to a QUIC protocol.

Figure 8:
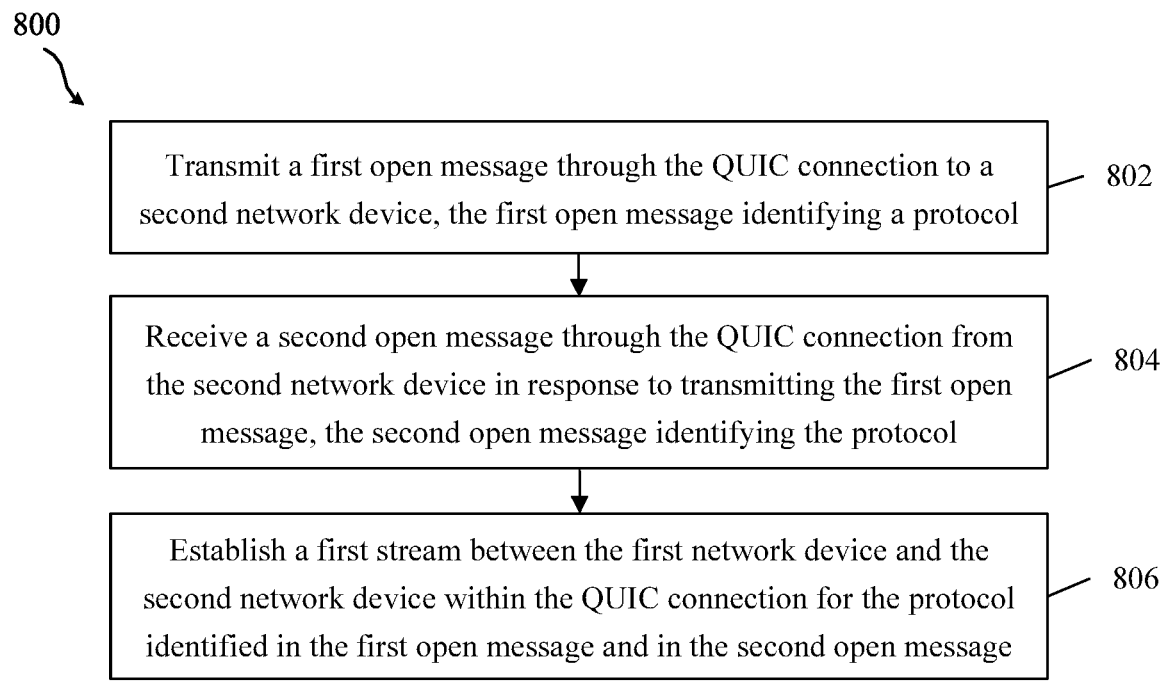
FIG. 8 is a method of establishing streams within a QUIC connection implemented by a second network device.

FIG. 8 is a method of establishing streams within a QUIC connection (e.g., QUIC connection 400, 512) implemented by a second network device (e.g., router 604).

In block 802, a first open message (e.g., open message 606) is received through the QUIC connection from a first network device (e.g., first router 602). The first open message identifies a protocol (e.g., IPv4 unicast). In an embodiment, the first open message indicates that the first router has multi-stream capability. In an embodiment, the protocol is identified using an AFI and/or a SAFI. In an embodiment, the first open message identifies a first plurality of protocols (e.g., IPv4 unicast, IPv6 unicast, IPv4 L3VPN, etc.) including the protocol (e.g., IPv4 unicast).

In block 804, a second open message (e.g., open message 608) is transmitted through the QUIC connection to the first network device in response to receiving the first open message. The second open message identifies the same protocol (e.g., IPv4 unicast). In an embodiment, the second open message indicates that the second router has multi-stream capability. In an embodiment, the second open message identifies a second plurality of protocols (e.g., IPv4 unicast, IPv4 L3VPN, etc.) including the protocol (e.g., IPv4 unicast).

In block 806, first application data (e.g., application data 220) is received though a first stream (e.g., first stream 406, 610) established between the first network device and the second network device within the QUIC connection. The application data corresponds to the protocol identified in the first open message and in the second open message.

In an embodiment, the method 800 further comprises receiving a third open message (e.g., open message 612) through the QUIC connection from the first network device. The third open message identifies a second protocol (e.g., IPv4 L3VPN). The method 800 further includes transmitting a fourth open message (e.g., open message 614) through the QUIC connection to the first network device in response to receiving the third open message. The fourth open message identifies the same second protocol (e.g., IPv4 L3VPN). The method 800 also comprises receiving second application data though a second stream (e.g., second stream 408, 616) established between the first network device and the second network device within the QUIC connection. The application data corresponds to the protocol identified in the third open message and in the fourth open message.

Figure 9:
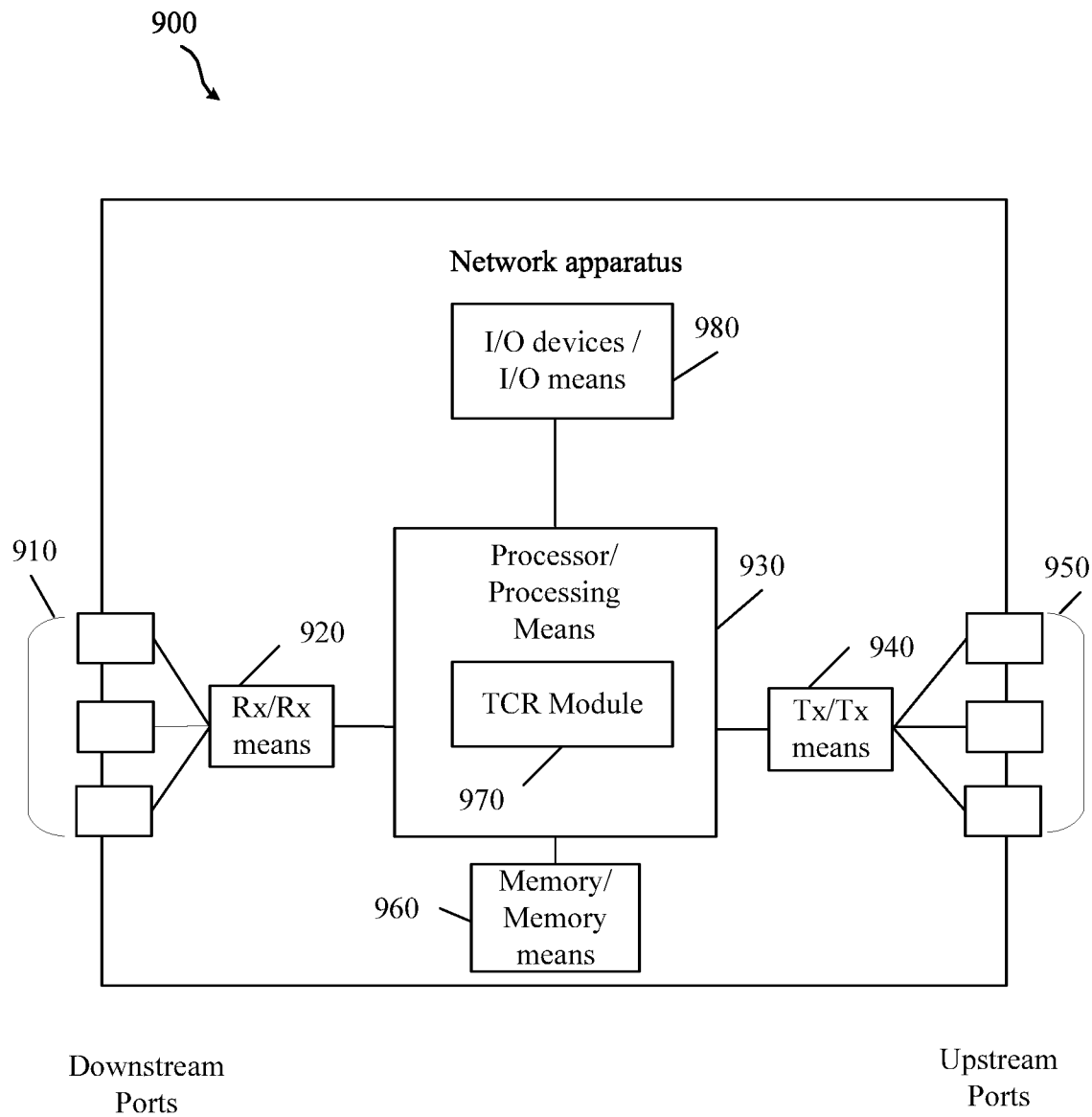
FIG. 9 is a schematic diagram of a network apparatus.

FIG. 9 is a schematic diagram of a network apparatus 900 (e.g., the first router 602 or the second router 604). The network apparatus 900 is suitable for implementing the disclosed embodiments as described herein. The network apparatus 900 comprises ingress ports/ingress means 910 and receiver units (Rx)/receiving means 920 for receiving data; a processor, logic unit, or central processing unit (CPU)/processing means 930 to process the data; transmitter units (Tx)/transmitting means 940 and egress ports/egress means 950 for transmitting the data; and a memory/memory means 960 for storing the data. The network apparatus 900 may also comprise optical-to-electrical (OE) components and electrical-to-optical (EO) components coupled to the ingress ports/ingress means 910, the receiver units/receiving means 920, the transmitter units/transmitting means 940, and the egress ports/egress means 950 for egress or ingress of optical or electrical signals.

The processor/processing means 930 is implemented by hardware and software. The processor/processing means 930 may be implemented as one or more CPU chips, cores (e.g., as a multi-core processor), field-programmable gate arrays (FPGAs), application specific integrated circuits (ASICs), and digital signal processors (DSPs). The processor/processing means 930 is in communication with the ingress ports/ingress means 910, receiver units/receiving means 920, transmitter units/transmitting means 940, egress ports/egress means 950, and memory/memory means 960. The processor/processing means 930 comprises a QUIC module 970. The QUIC module 970 is able to implement the methods disclosed herein. The inclusion of the QUIC module 970 therefore provides a substantial improvement to the functionality of the network apparatus 900 and effects a transformation of the network apparatus 900 to a different state. Alternatively, the QUIC module 970 is implemented as instructions stored in the memory/memory means 960 and executed by the processor/processing means 930.

The network apparatus 900 may also include input and/or output (I/O) devices/I/O means 980 for communicating data to and from a user. The I/O devices I/O means 980 may include output devices such as a display for displaying video data, speakers for outputting audio data, etc. The I/O devices I/O means 980 may also include input devices, such as a keyboard, mouse, trackball, etc., and/or corresponding interfaces for interacting with such output devices.

The memory/memory means 960 comprises one or more disks, tape drives, and solid-state drives and may be used as an over-flow data storage device, to store programs when such programs are selected for execution, and to store instructions and data that are read during program execution. The memory/memory means 960 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of establishing streams within a QUIC connection implemented by a first network device, comprising:
   transmitting a first open message through the QUIC connection to a second network device, the first open message specifying a protocol to be used for a first stream;
   receiving a second open message through the QUIC connection from the second network device in response to transmitting the first open message, the second open message specifying the protocol to be used for the first stream; and
   establishing the first stream between the first network device and the second network device within the QUIC connection for the protocol specified in the first open message and in the second open message.

2. The method of claim 1, wherein the first open message indicates that the first network device has multi-stream capability, and wherein the second open message indicates that the second network device has multi-stream capability.

3. The method of claim 1, wherein the protocol is specified using an address family identifier (AFI) and a subsequent address family identifier (SAFI).

4. The method of claim 1, wherein the first open message identifies a first plurality of protocols including the protocol.

5. The method of claim 1, wherein the second open message identifies a second plurality of protocols including the protocol.

6. The method of claim 1, wherein the method further comprises:
   transmitting a third open message through the QUIC connection to the second network device, the third open message specifying a second protocol to be used for a second stream;
   receiving a fourth open message through the QUIC connection from the second network device in response to transmitting the third open message, the fourth open message specifying the second protocol to be used for the second stream; and
   establishing the second stream between the first network device and the second network device within the QUIC connection for the second protocol specified in the third open message and in the fourth open message.

7. The method of claim 6, further comprising transmitting or receiving a notification message carrying a cease error code, the cease error code indicating that the first stream or the second stream is to be torn down.

8. The method of claim 1, wherein the method further comprises:
   receiving a third open message through the QUIC connection from the second network device, the third open message specifying a second protocol;
   transmitting a fourth open message through the QUIC connection to the second network device in response to receiving the third open message, the fourth open message specifying the second protocol; and
   establishing a second stream between the first network device and the second network device within the QUIC connection for the second protocol specified in the first open message and in the second open message.

9. The method of claim 1, wherein prior to transmitting the first open message, the method further comprises:
   transmitting a QUIC connection request to the second network device;
   receiving a first acknowledgement (ACK) message from the second network device in response to transmitting the QUIC connection request; and
   transmitting a second ACK message to the second network device to confirm that the QUIC connection has been established in accordance with the QUIC connection request.

10. The method of claim 9, wherein the QUIC connection request comprises one or more of a request to perform a QUIC handshake and transport layer security (TLS) authentication according to a QUIC protocol, and wherein the first ACK message indicates to the first network device that the second network device is capable of establishing the QUIC connection.

11. The method of claim 1, wherein the first stream comprises a control stream, wherein the control stream is used to manage other streams within the QUIC connection, and wherein the control stream does not carry any application data.

12. The method of claim 1, further comprising transmitting or receiving a cease connection message, the cease connection message indicating that the QUIC connection is to be torn down.

13. A method of establishing streams within a QUIC connection implemented by a second network device, comprising:

receiving a first open message through the QUIC connection from a first network device, the first open message specifying a protocol to be used for a first stream;

transmitting a second open message through the QUIC connection to the first network device in response to receiving the first open message, the second open message specifying the protocol to be used for the first stream; and receiving first application data though the first stream established between the first network device and the second network device within the QUIC connection, the first application data corresponding to the protocol specified in the first open message and in the second open message.

14. The method of claim 13, wherein the first open message indicates that the first network device has multi-stream capability, and wherein the second open message indicates that the second network device has multi-stream capability.

15. The method of claim 13, wherein the protocol is specified using an address family identifier (AFI) and a subsequent address family identifier (SAFI).

16. The method of claim 13, wherein the first open message identifies a first plurality of protocols including the protocol.

17. The method of claim 13, wherein the second open message identifies a second plurality of protocols including the protocol.

18. The method of claim 13, wherein the method further comprises:

receiving a third open message through the QUIC connection from the first network device, the third open message specifying a second protocol to be used for a second stream;

transmitting a fourth open message through the QUIC connection to the first network device in response to receiving the third open message, the fourth open message specifying the second protocol to be used for the second stream; and receiving second application data though the second stream established between the first network device and the second network device within the QUIC connection, the second application data corresponding to the protocol specified in the third open message and in the fourth open message.

19. An apparatus in a network and configured to establish streams within a QUIC connection, comprising:

a memory storing instructions; and one or more processors coupled to the memory, and configured to:

transmit a first open message through the QUIC connection to a second network device, the first open message specifying a protocol to be used for a first stream;

receive a second open message through the QUIC connection from the second network device in response to transmitting the first open message, the second open message specifying the protocol to be used for the first stream; and establish the first stream between a first network device and the second network device within the QUIC connection for the protocol specified in the first open message and in the second open message.

20. The apparatus of claim 19, wherein the first open message indicates that the first network device has multi-stream capability, wherein the second open message indicates that the second network device has multi-stream capability, wherein the protocol is specified using an address family identifier (AFI) and a subsequent address family identifier (SAFI), wherein the first open message identifies a first plurality of protocols including the protocol, and wherein the second open message identifies a second plurality of protocols including the protocol.

* * * * *